US006779080B2

(12) United States Patent
Basham et al.

(10) Patent No.: US 6,779,080 B2
(45) Date of Patent: Aug. 17, 2004

(54) SERIAL DATA STORAGE SYSTEM WITH AUTOMATICALLY ADJUSTED DATA PROTECTION TO IMPLEMENT WORM MEDIA WITH LIMITED OVERWRITE ALLOWING WRITE APPENDING

(75) Inventors: Robert Beverley Basham, Aloha, OR (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 09/978,117

(22) Filed: Oct. 15, 2001

(65) Prior Publication Data

US 2002/0035665 A1 Mar. 21, 2002

Related U.S. Application Data

(63) Continuation-in-part of application No. 09/482,985, filed on Jan. 11, 2000, now Pat. No. 6,339,810.

(51) Int. Cl.[7] .............................................. G06F 12/00
(52) U.S. Cl. ........................... 711/112; 711/4; 711/111; 711/170; 711/202; 360/48; 360/57; 360/60; 360/90; 369/84; 369/275.2
(58) Field of Search ............................ 711/9, 111, 112, 711/170, 202; 360/48, 57, 60, 90; 369/84, 275.2

(56) References Cited

U.S. PATENT DOCUMENTS

| 5,455,926 | A | | 10/1995 | Keele et al. ................. 395/404 |
|---|---|---|---|---|
| 5,485,321 | A | | 1/1996 | Leonhardt et al. ............ 360/48 |
| 5,535,188 | A | | 7/1996 | Dang et al. .................... 369/84 |
| 5,805,864 | A | | 9/1998 | Carlson et al. ............... 703/24 |
| 5,940,853 | A | | 8/1999 | Ooi et al. .................... 711/111 |
| 5,974,424 | A | * | 10/1999 | Schmuck et al. ........... 707/201 |
| 6,006,229 | A | * | 12/1999 | Schmidt et al. ............... 707/10 |
| 6,021,508 | A | * | 2/2000 | Schmuck et al. .............. 714/4 |
| 6,023,388 | A | | 2/2000 | Ikeda et al. ................. 360/721 |
| 6,070,224 | A | | 5/2000 | LeCrone et al. ............ 711/112 |
| 6,098,148 | A | | 8/2000 | Carlson ....................... 711/112 |
| 6,105,103 | A | * | 8/2000 | Courtright et al. ............. 711/1 |
| 6,128,698 | A | | 10/2000 | Georgis ...................... 711/111 |
| 6,134,204 | A | | 10/2000 | Taugher ....................... 369/59 |
| 6,339,810 | B1 | * | 1/2002 | Basham et al. ............. 711/111 |

* cited by examiner

*Primary Examiner*—T Nguyen (57) ABSTRACT

In a data storage subsystem, drive-level processing treats data storage media as WORM by automatically advancing a write append limiter as data is written, and preventing changes to data occurring before the write append limiter. Despite this media's WORM nature, the drive-level processing permits limited overwriting of data at the end of tape since the write append limiter lags the current write location by the margin of a write allowance index. Thus, despite the drive's treatment of the media as WORM, the drive permits overwriting of trailing metadata in order to facilitate write append operations.

50 Claims, 6 Drawing Sheets

SERIAL DATA STORAGE SYSTEM WITH AUTOMATICALLY ADJUSTED DATA PROTECTION TO IMPLEMENT WORM MEDIA WITH LIMITED OVERWRITE ALLOWING WRITE APPENDING

CROSS-REFERENCE TO RELATED APPLICATION(S)

This application is a Continuation-In-Part of U.S. patent application Ser. No. 09/482,985, filed on Jan. 11, 2000 in the names of the present inventors, and assigned to International Business Machines Corp. now U.S. Pat. No. 6,399,810.

BACKGROUND OF THE INVENTION

1. Field of the Invention

The present invention relates to data storage subsystems that employ portable serial data storage media such as magnetic tape cartridges. More particularly, the invention concerns a data storage system with drive-level processing that renders data storage media as write-once-read-many ("WORM"). Despite this WORM quality, the drive-level processing permits limited overwriting of trailing data facilitate write append operations.

2. Description of the Related Art

Data is stored on a variety, of different media today, such as magnetic tape, magnetic disk, optical disk, circuit memory, and many more. Certain storage media is known as WORM, meaning "write once read many." True to its name, this media only allows a single writing, then it becomes read-only. After data is written, the data cannot be erased. Optical storage devices are most frequently utilized as WORM media, because they utilize a permanent form of recording on the media by creating non-removable pits in the media surface. As one example, certain types of compact disc media qualify as WORM media.

More recently, "virtual WORM" technology has emerged. With virtual WORM, base-level read/write hardware selectively allows or rejects host write requests to effectively treat an otherwise rewritable media as WORM media. When this technique is applied to magnetic tape, there are certain technical limitations. Namely, the dedication of rewritable magnetic tape for WORM use ruins the possibility of performing "write append" operations. "Write append" operations occur when the host desires to add more data to tape after one or more initial writes are performed. Write append operations are not possible because certain end-of-data metadata is always written after the data is laid down on tape. The end-of-data metadata includes trailer labels, file marks, EOD markers, and other metadata that signals the end of data. The end-of-data metadata cannot be overwritten because the media is being treated as WORM, which forecloses the possibility of any overwriting. Therefore, even if additional user data were to be stored after the end-of-data metadata, the traditional tape processing applications would stop after encountering the end-of-data metadata, and effectively ignore the additional user data.

Without the write append function, tape utilization is much less efficient, especially with the massive storage capacities of today's tapes. For example, tape utilization is a mere ten percent when a ten gigabyte file is stored on a magnetic tape of one hundred gigabytes. Without write append, ninety gigabytes of the tape is wasted. Of course, utilization is higher when there are larger files that require storage, but data is not always available in sufficiently large blocks. Consequently, tape space is frequently wasted, which boosts the user's tape purchase expenses. Wasted tape space also slows data access time because there is less data stored on more tapes, requiring more tape load/unload operations.

As one alternative, data can be buffered and written to tape en masse prior to laying down the end-of-data metadata. However, this increases the tape processing overhead, and introduces some risk of losing buffered data because it delays the ultimate time that data is finally preserved by writing it to tape.

Consequently, the implementation of virtual WORM in magnetic tape and other serially accessible data storage media is not completely adequate for some applications due to certain unsolved problems.

SUMMARY OF THE INVENTION

Broadly, the present invention concerns a data storage system with drive-level processing that renders data storage media as write-once-read-many ("WORM"). Despite this WORM quality, the drive-level processing permits limited overwriting of trailing data facilitate write append operations.

The foregoing results are achieved by the following operations. Initially, the drive receives one or more write requests, each write request including corresponding write data. The drive establishes a target write location, which may be performed by various techniques. In response to the write request, the drive stores the write data so as to preserve certain previously stored data. Namely, the drive obtains a write append limiter sequentially identifying a location on the data storage medium before which data is not permitted to be altered. Then the drive proceeds to determine whether the target write location occurs before the write append limiter. If so, the drive generates an error message. If the target write location occurs at or after the write append limiter, the drive stores the write data upon the data storage medium beginning at the target write location, and updates the write append limiter if needed.

The write append limiter is updated whenever the amount of data written after the write append limiter exceeds a write allowance index. The write allowance index may be modified, for example in response to user requests. However, requests to modify the write allowance index are rejected unless they seek to decrease it. In configurations where write and write append operations store data that is logically divided into "blocks," the write allowance index may be an integer number of such blocks.

Following each write operation, the drive may store a prescribed size of trailing metadata serving various purposes, such as marking the end of data, etc. In this case, the write allowance index may advantageously be set to a size that matches the trailing metadata (or larger), to permit the host to overwrite the trailing metadata with a subsequent write append operation.

In one embodiment, the invention may be implemented to provide a method to operate a read/write drive to conduct read, write, and write append operations upon removable, serially accessible, data storage media so as to render the media as WORM, with limited data overwriting to facilitate write append operations. In another embodiment, the invention may be implemented to provide an apparatus, such as a read/write drive, configured to operate in such a manner. In still another embodiment, the invention may be implemented to provide a signal-bearing medium tangibly embodying a program of machine-readable instructions executable by a digital data processing apparatus to direct a read/write drive as explained above. Another embodiment concerns logic circuitry having multiple interconnected electrically conductive elements configured to direct the read/write drive as stated above.

The invention affords its users with a number of distinct advantages. For instance, the invention protects user data from loss by treating it as "read-only" after it is initially stored. Nonetheless, the invention facilitates write append operations by permitting limited overwriting of trailing metadata. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Introduction

One aspect of the invention concerns a data storage system, which may be embodied by various hardware components and interconnections. In one embodiment, shown in FIG. 1, the data storage system 100 includes a data storage library 104 coupled to at least one hierarchically superior host 102.

Data Storage Media

Figure 1:
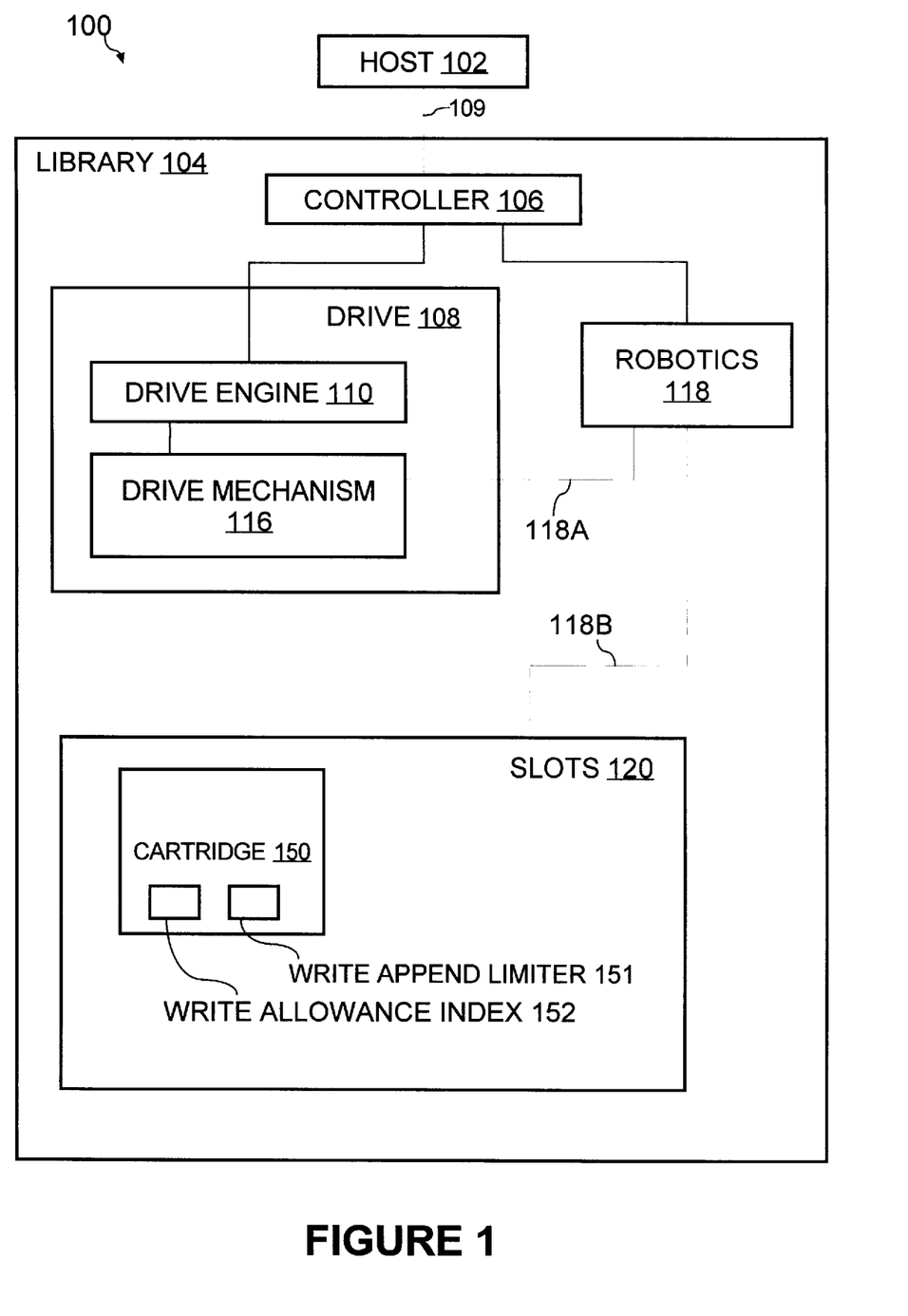
FIG. 1 is a block diagram of the hardware components and interconnections of a data storage system according to the invention.

The library 104 includes many portable data storage media, an individual example of which is provided by 150. Data storage media may comprise rewritable, serial data storage media such as magnetic tape cartridges, magnetic optical disks, optical cartridges, writeable CDs, etc. For ease of reference, the portable data storage media of the library 104 are referred to as "cartridges."

In one exemplary embodiment, all data is written to the cartridges in equal-sized, numbered parcels called "logical blocks." The logical blocks may be identified by logical block numbers ("LBNs") or another sequential numbering or labeling scheme.

Among other information such as customer data, each cartridge contains various write parameters including a write append limiter 151 and a write allowance index 152. The use of these parameters is discussed in greater detail below.

Host(s)

Among other possible functions, the host 102 supplies data to the library 104 for storage, and send requests to the library 104 to retrieve data. The host role may be satisfied by various types of hardware, such as one or more digital data processing computers, logic circuits, constructions of discrete circuit components, interfaces to human operators, etc. As an example, the host 102 may comprise an IBM RS/6000 machine employing an operating system such as AIX. This machine may also be coupled to respective interfaces (not shown), enabling this machine to exchange information with a human operator. Each such interface may comprise a control panel, video monitor, computer keyboard/mouse, or another appropriate human/machine interface.

Library

The library 104 is coupled to the host 102 by an interface 109, which may be embodied in various forms. Some examples include wires/cables, one or more busses, fiber optic lines, wireless transmission, intelligent communications channel, etc. The library 104 carries out host requests to move cartridges, access cartridge data, etc. In one embodiment, the library 104 comprises a SCSI removable media library, such as a tape library. Along with other alternatives, the library 104 may utilize other connectivity options, such as a fibre channel-to-SCSI bridge product, SCSI-to-SCSI multiplexer, etc.

The library 104 includes a drive 108, robotics 118, controller 106, and various slots 120.

Drive

The drive 108 conducts read/write operations with cartridges of the library 104. Cartridges are directed to/from the drive 108 by robotics 118, described below. The drive comprises suitable hardware to access the format of data storage cartridges in the library 104. For example, in the case of magnetic tape cartridges, the drive 108 may comprise an IBM model 3590 tape drive.

More particularly, the drive 108 includes a drive mechanism 116 and drive engine 110. The drive mechanism 116 includes electrical and mechanical components that receive, position, and access cartridges. For instance, the drive mechanism 116 includes a cartridge-receiving opening, mechanical components to lock the cartridge in place, ejection motor, read/write hardware, and the like.

The drive engine 110 is an electronic module that performs both control and data functions. The drive engine 110 comprises a digital data processing machine, logic circuit, construction of discrete circuit components, or other automated mechanism, and operates according to suitable programming, physical configuration, etc. In its control function, the drive engine 110 supervises operation of the drive mechanism 116 by activating cartridge ejection at appropriate times, positioning read/write components, etc. In its data function, the drive engine 110 manages the data that is read from and written to data cartridges in the drive mechanism 116. Importantly, the drive engine 110 constitutes drive-level processing that effectively renders media as write-once-read-many ("WORM"). The WORM nature of the media may be known or unknown to the controller 106, hosts 102, and any other hierarchically superior processors. As explained in greater detail below, the drive engine 110 permits limited overwriting of data to facilitate write append operations.

Cartridge Storage & Management

The library 104 includes equipment to physically store and move the cartridges. For storage, the library 104 includes various slots 120 that include storage and input/output ("I/O") slots (not separately shown) to house dormant cartridges. The storage slots comprise shelves or other data storage library compartments. The I/O slots facilitate transferring cartridges to/from the library 104, and may even allow cartridge exchanges without disrupting the operation of the robotics 118 or drive 106. Using the I/O slots, an operator can introduce cartridges into the library 104 ("insert" operation), or the library 104 can expel cartridges ("eject" operation). For example, the I/O slots may comprise "pass-through" slots, a carriage, conveyor, etc.

To move cartridges between the drives 108 and slots 120, the library 104 includes robotics 118. The robotics 118 access these components by respective paths 118*a*, 118*b*. The robotics 118 may be implemented by any suitable cartridge movement machinery, such as robotic arms, integrated cartridge loading equipment, conveyors, grippers movable on an x-y coordinate system, etc.

Controller

The library 104 operates under supervision of the controller 106, which receives commands from the host 102 requesting the controller 106 to move cartridges between the slots 120 and drive 108, and to carry out read/write operations with the cartridges. The controller 106 communicates with the host 102 via the interface 109.

The controller 106 comprises a digital data processing machine, logic circuit, construction of discrete circuit components, or other automated mechanism, and operates according to suitable programming, physical configuration, etc. To provide a specific example, the controller 106 may comprise an IBM POWER-PC processor.

Exemplary Digital Data Processing Apparatus

In embodiments where intelligent components of the system 100 are implemented with data processing machines, these machines may be implemented in various forms. For example, the controller 106 or drive engine 110 may be embodied by various hardware components and interconnections, such as the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital, data storage apparatus discussed previously, a different embodiment of the invention uses logic circuitry instead of computer-executed instructions to implement intelligent components such as the drive engine 110 or controller 106. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Alternative Embodiment

Still within the scope of this invention, the system of FIG. 1 may be implemented without certain illustrated components. For instance, the drive 108 may still perform the functions of this invention without utilizing the slots 102 or robotics 118. Instead, operators can manually insert and remove cartridges from the drive mechanism 116. Furthermore, either the controller 106 or host 102 may be omitted, leaving a single hierarchically superior processor. Ordinarily skilled artisans, having the benefit of this disclosure, may perceive even further alterations nonetheless contemplated by this invention. Thus, the hardware components and interconnections of FIG. 1 are merely provided to specifically illustrate one particular embodiment.

Operation

In addition to the various hardware embodiments described above, a different aspect of the invention concerns a method for operating a read/write drive to conduct read, write, and write append operations upon removable, serially accessible, data storage media so as to render the media as WORM with limited overwriting that permits write append operations.

Signal-Bearing Media

Figure 2:
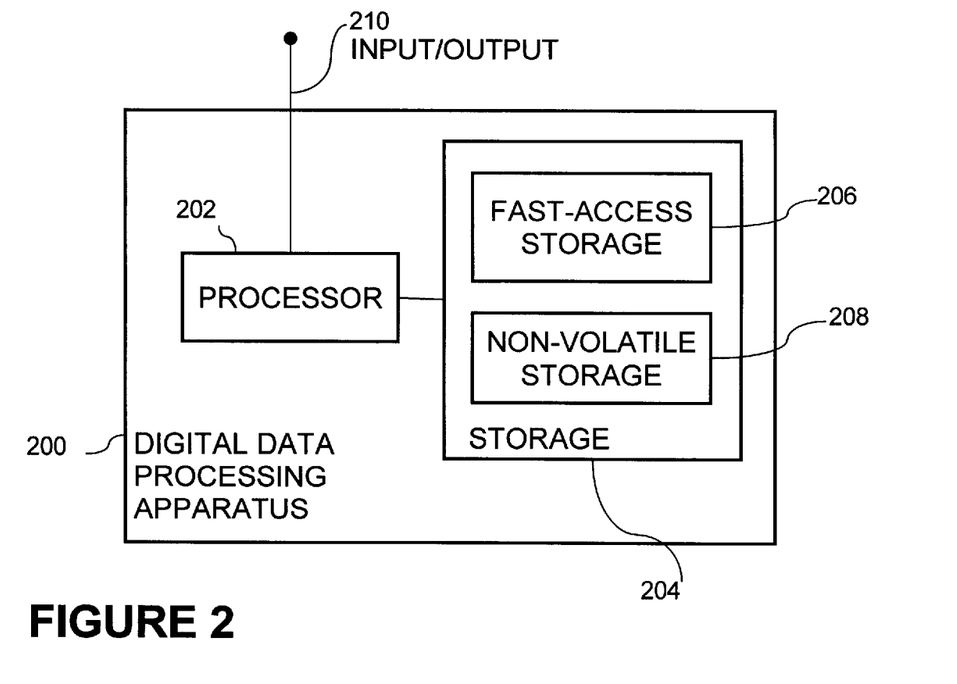
FIG. 2 is a block diagram of a digital data processing machine according to the invention.

In the context of FIGS. 1–2, such a method may be implemented, for example, by operating the drive engine 110, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to operating a read/write drive to conduct read, write, and write append operations upon removable, serially accessible, data storage media so as to render the media as WORM, with limited overwriting that allows write appending.

Figure 3:
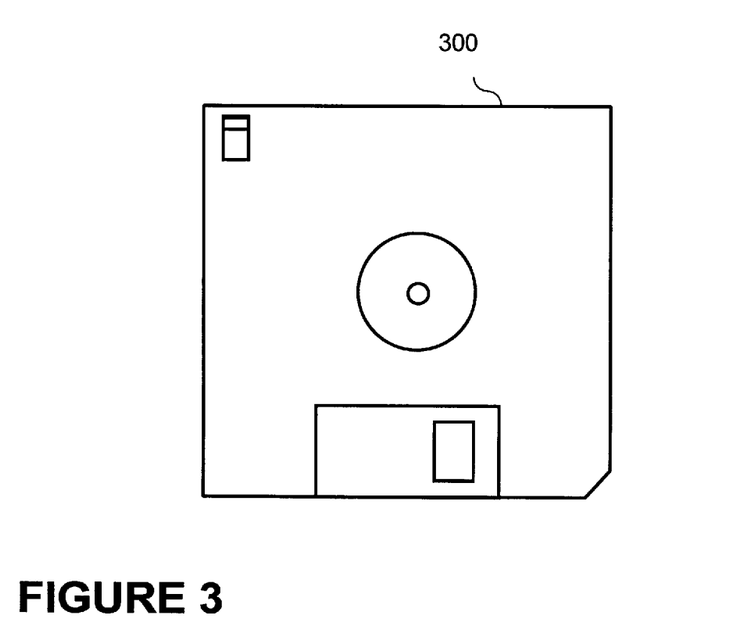
FIG. 3 shows an exemplary signal-bearing medium according to the invention.

This signal-bearing media may comprise, for example, RAM (not shown) contained within the drive engine 110, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 200, or elsewhere, the instructions may be stored on a variety of machine-readable data storage media, such as direct access storage (e.g., a conventional "hard drive," redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the drive engine 110, and is configured to perform operations to implement the method of the invention. The logic circuitry may be implemented using many different types of circuitry, as discussed above.

Write and Write Append Operation

Figure 4:
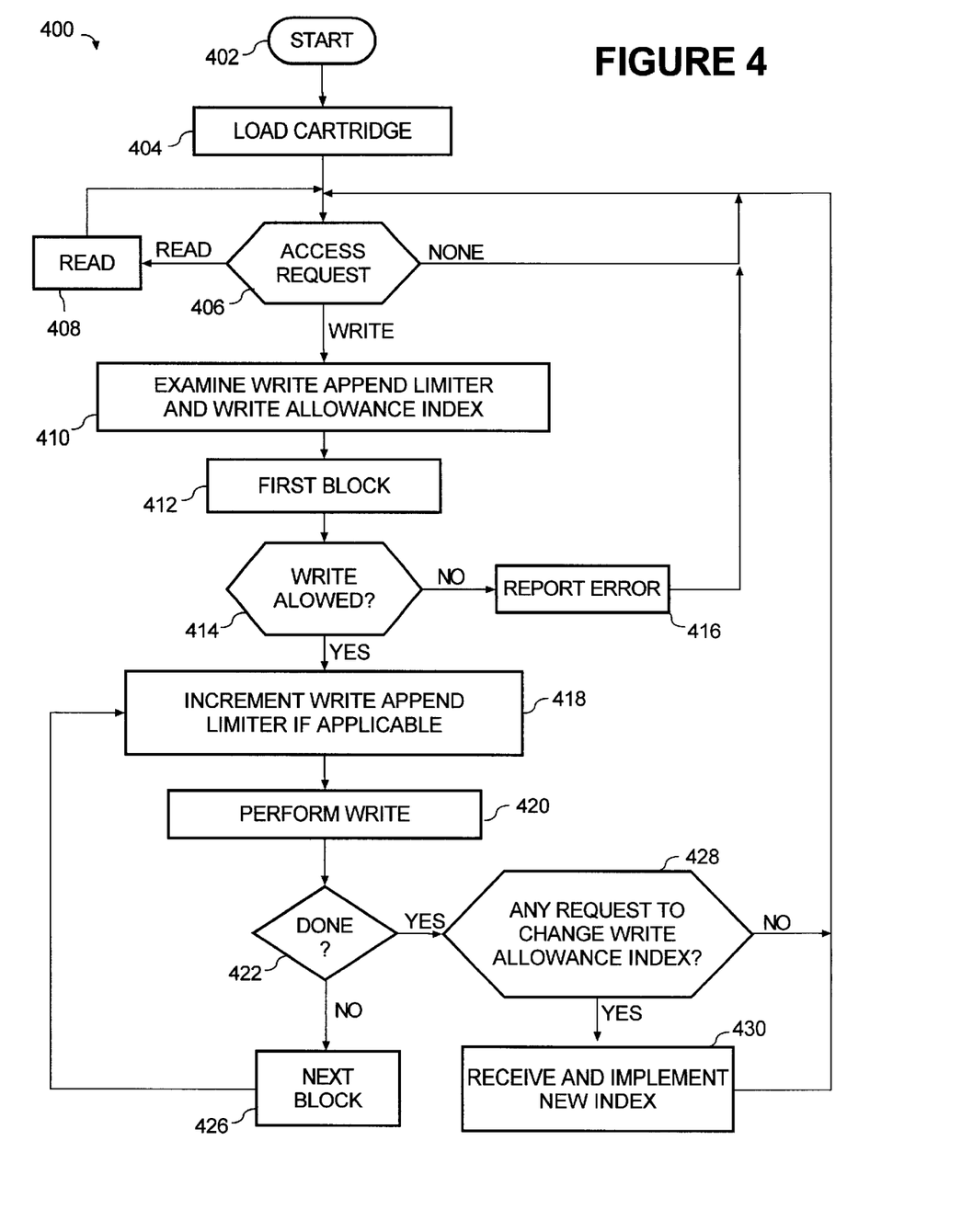
FIG. 4 is a flowchart showing a sequence for processing write and write append requests to implement WORM storage with limited overwriting to allow write append operations, according to the invention.

FIG. 4 shows one exemplary sequence 400 for processing write and write append requests to implement WORM storage; For ease of explanation, but without any intended limitation, the example of FIG. 4 is described in the context of the data storage system 100 described above, with the steps 400 being performed by the drive engine 110. The steps 400 are initiated in step 402, which occurs in response to a write or write append instruction from the host 102 via the controller 106. Following step 402, the drive engine 110 directs the drive mechanism 116 to load a cartridge (step 404), which is received into the drive 108 from the robotics 118. In step 406, the drive engine 110 determines whether there has been any host read or write request (received via the controller 106) to access the cartridge present in the drive mechanism 116. If not, step 406 repeats. If a read request has been received, the drive engine 110 directs the drive mechanism 116 to read the requested data from the cartridge (step 408).

If step 406 detects a write request, then the routine 400 progresses to step 410. The write request originates with the host, and includes a write command along with various parameters including write data. In one embodiment, the write request does not contain any host-specified target write location, in which case the target write location is provided by another source such as a "current" location maintained by the drive. As another example, where the write request does not contain any host-specified target write location, the next location after the write append limiter may be routinely selected as the target write location. Alternatively, the write request may include a target write location on the cartridge. For example, such a target write location may specify a particular logical block number ("LBN"), in embodiments where data is sequentially written to data storage cartridges in equal-sized, numbered parcels called "logical blocks." Moreover, instead of such explicit specification, the target write location may be specified implicitly by host requests to change the drive's "current" read/write location in relative terms, without specifying any particular LBN.

In response to the write request, the drive 108 proceeds to store the write data so as to preserve certain previously stored data, as explained below. In general, the drive 108 treats data occurring before the write append limiter as being WORM, thereby permitting overwriting of data, occurring after the write append limiter. More particularly, with reference to FIG. 4, after step 406 the drive engine 110 references the write append limiter 151 and write allowance index 152 stored upon the cartridge (step 410). The write append limiter 151 identifies a sequential location on the cartridge before which data is not permitted to be altered. In other words, the write append limiter designates a "wall" that protects any preceding data as "read-only." In one example (illustrated in FIG. 7A, discussed below), the write append limiter may comprise a pointer or other indicia to identify the number of a particular logical block (i.e., LBN) or other write location. This pointed-to block is therefore writable. Despite this specific example, this invention still contemplates other forms of write append limiter, such as file number, time stamp, etc.

The write allowance index 152 is used to determine when to move the write append limiter forward, and in this respect specifies an amount of stored trailing information that can be overwritten. In the present example, where data is sequentially written to cartridges in logical blocks, the write allowance index comprises an integer that tells how many trailing logical blocks that the drive engine 110 will permit to be overwritten by virtue of the presence of these logical blocks forward of the write append limiter. The use and advancement of the write allowance index is discussed in greater detail below.

Each cartridge contains a write append limiter and write allowance index, as demonstrated by the cartridge 150 (FIG. 1). A write append limiter 151 and write allowance index 152 may be stored on each newly manufactured tape cartridge, thereby enabling treatment of the first write operation according to the sequence 400. For instance, the write allowance index 152 may be initially set to a large number (since it can be decreased but never increased, as explained below), and the write append limiter 151 may be established just after any mandatory beginning of tape ("BOT") metadata.

After step 410, the drive engine 110 considers a first block of the write data in step 412. Although the present example progresses block-by-block, different approaches to writing multi-block data objects may be used instead. The block under current consideration is called the "current" block. In step 414, the drive engine 110 determines whether it will permit writing of the current block at the target write location as specified in the write request. This is determined by considering whether the target write location occurs before the write append limiter, or after (or at) the write append limiter. If the target write location occurs before the write append limiter, the write is not allowed. In this case, the drive engine 110 reports a write error (step 416) to the controller 106, aborts the write operation, and returns to step 406. If the target write location occurs at or after the write append limiter, the write is permitted. In this case, the drive engine 110 proceeds to increment the write append limiter if needed (step 418). The drive engine 110 also stores the updated write append limiter at the cartridge's location 151 (FIG. 1). In contrast to the foregoing description, where the write append limiter identifies the first writable block, the write append limiter may be used to signify the last non-writable block. The next block would then constitute the first writable block.

In the foregoing example, the write append limiter identifies a particular write location. In a different embodiment (shown in FIG. 7B, explained below), the write append limiter may identify a location between write locations, simplifying the analysis of comparing target write location to write append limiter. In this embodiment, writes are not allowed if the target write location occurs before the write append limiter. Writes are permitted if the target write location occurs after the write append limiter. The write location cannot possibly be at the write append limiter.

In any case, the write append limiter is updated whenever the amount of data written after the write append limiter exceeds the margin prescribed by the write allowance index. Thus, the write append limiter incrementally advances along with the storage of more data on the cartridge, designating data behind the "wall" of the write append limiter as being "read-only." Incrementing of the write append limiter is discussed in greater detail below. Optionally, updates to the write append limiter may buffered and the actual storage on the cartridge deferred until the controller receives a command to unload the cartridge, whereupon the most recent write append limiter is written to the cartridge.

One exemplary type of write allowance index is an integer. In this context, if the write allowance index (abbreviated as "x") is the integer five, then the write append limiter is updated whenever the target write location exceeds the write append limiter by more than five. Updating may comprise, for example, advancing the write append limiter by the number of blocks written.

The invention also contemplates other forms of write allowance index. Another example is a write allowance index that specifically identifies a number of "file marks" or "data blocks" instead of generally identifying a number of logical blocks. In this example, the write append limiter is updated whenever the target write location exceeds the write append limiter by this number of file marks (or data blocks). Another example of the write allowance index is a composite index that includes one prescribed number of file marks, and another prescribed number of logical blocks.

In the illustrated example, the write append limiter is updated (step 418) before actually writing the data (step 420). This protects the data that is written in step 420, in case of a drive crash or other error that would otherwise prevent updating of the write append limiter after a failed write. Although less advantageous in this respect, the order of steps 418 and 420 may be reversed if desired.

After step 418, the drive engine 110 writes the current block of write data (step 420). The entire write operation is finished (step 422) when all blocks of the write request have been written. Until this time, step 422 repeatedly advances to step 426 to choose the next block, then returns to steps 418, 420. When the write operation is finished, step 422 advances to step 428.

In step 428, the drive engine 110 entertains any requests to amend the write allowance index 152. Such, requests are received from the controller 106, and may ultimately originate from the host 102. The host 102 may seek to amend the write allowance index for various reasons. In one scenario, data storage cartridges are manufactured with a broadly permissive number (such as x=5) stored as the write allowance index 152, and the drive engine 110 permits users to reduce the write allowance index to meet the particular needs of their applications.

In the absence of a request to change the write allowance index, step 428 returns to step 406, which considers the next cartridge access request. Alternatively, step 428 proceeds to step 430 if there has been a request to modify the write allowance index of the currently loaded cartridge. In step 430, the drive engine 110 receives the new write allowance index and stores this index on the cartridge in place of the existing write allowance index at 152. Preferably, step 430 denies any requests to increase the write allowance index. Increasing the write allowance index may result in overwriting valuable data that was written with a write allowance index that would not have permitted any changes to that data. Therefore, to truly treat data as "read-only" at the time of writing, then the drive engine 110 should not permit amendments to the write allowance index to override the data's read-only status: After step 430, the routine 400 returns to step 406 as discussed above.

Write Allowance Index-One Example

Figure 5:
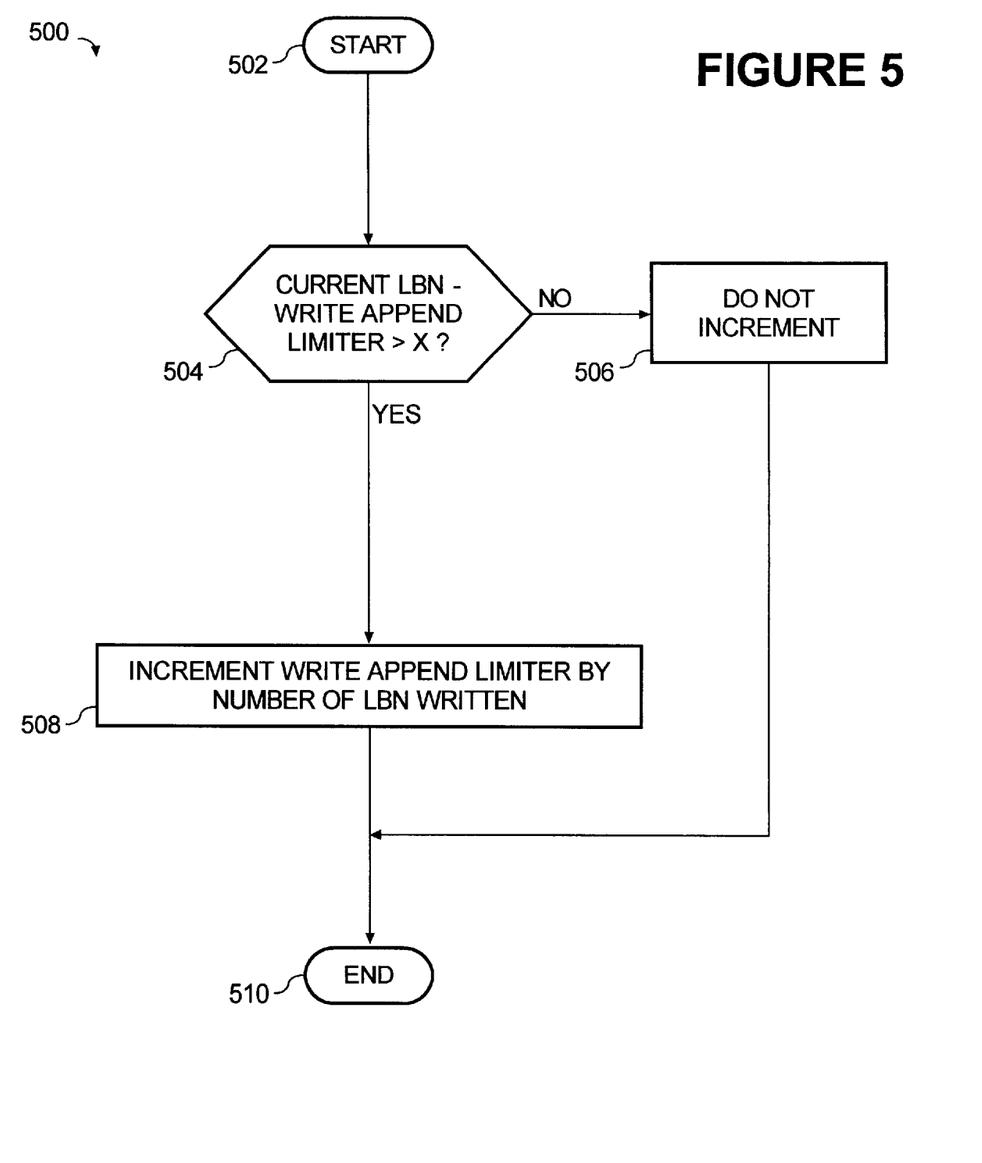
FIG. 5 is a flowchart showing one exemplary sequence for advancing a write append limiter according to the invention.

FIG. 5 shows one sequence 500 for advancing the write append limiter (i.e., implementing step 418, FIG. 4). For ease of explanation, but without any intended limitation, the example of FIG. 5 is described in the context of the system 100 described above. In the example of FIG. 5, the write allowance index 152 comprises an integer, such as zero, one, two, three, etc.

Figure 7A:
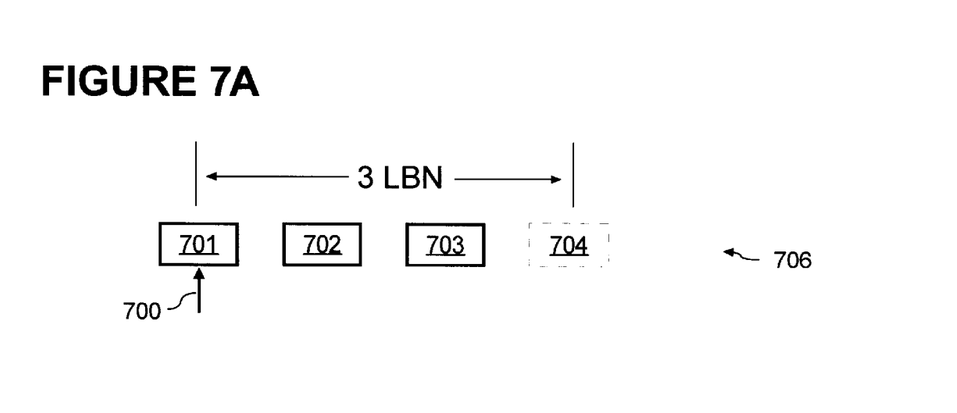
FIGS. 7A–7B are block diagrams illustrating the relationship between various logical blocks, a write append limiter, and write allowance index comprising a simple integer, according to two different embodiments of the invention.

The steps 500 are initiated in step 502. In step 504, the drive engine 110 determines whether the target write location ("current LBN") exceeds the location of the write append limiter by more than the amount of the write allowance index ("x"). To illustrate, FIG. 7A shows an exemplary track 706 of data being written on a cartridge. The write append limiter 700 points to a logical block 701. A new block 704 being written is the third block past the write append limiter. Therefore, if the write allowance index is "two," then the write append limiter should be updated by moving it to the block 702 (i.e., two blocks behind the current block being written), so that the write allowance index is satisfied. Equation 1, below, states this determination in another way.

$$\text{increment if: current LBN−write append limiter} > x \qquad [1]$$

where: current LBN=the logical block number of the target write location, i.e., the block to be written in step 420.

x=the write allowance index (an integer).

write append limiter=the logical block number of the write append limiter.

Returning to FIG. 5, if step 504 finds that the write append limiter should be incremented, step 508 advances the write append limiter by the number of logical blocks written. In the illustrated example, where the routine 500 is performed once for each block written, step 508 advances the write append limiter by one logical block. The drive engine 110 also stores the new write append limiter at the cartridge's location 151.

As an alternative to step 508, the write append limiter is not incremented (step 506) if there is a negative answer to step 504. After step 508 or step 506, the routine 500 ends in step 510, thereby completing step 418 and thereafter advancing to step 420 (FIG. 4).

To further explain several aspects of the routine 500, selection of the write allowance index is discussed in greater detail. Namely, the write allowance index may be selected to compliment the content of data stored on the cartridge. In one embodiment, the last several logical blocks of each write operation may routinely consist of certain data-concluding metadata, such as file marks, trailer labels, and other data that signals the end of the tape. This metadata arrives from the host 102 in the same fashion as other "customer" data, and is not treated any differently by the drive engine 110 in the process 400. However, the operator may wisely utilize knowledge of certain metadata characteristics, to most advantageously choose the write allowance index. For instance, if the data-concluding metadata always consists of three logical blocks, the operator may set the write allowance index at three. Therefore, the write append limiter will always trail the data written by three logical blocks (i.e., the metadata). Residing past the write append limiter, this metadata is therefore unprotected, and subject to rewriting. Since the write allowance index specifies a data size that is at least as large as the data-concluding metadata, the operation of storing write append data either (1) permits removal of the trailing metadata, depending upon the target write location, or (2) automatically removes the trailing metadata if write operations are always conducted beginning at the write append limiter.

Figure 7B:
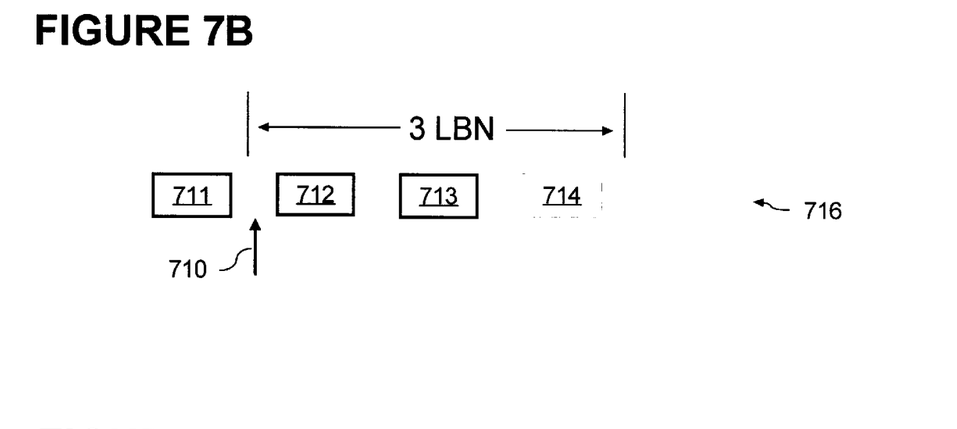

In the foregoing example, the write append limiter points to a logical block. In a different example, the write append limiter may signify a location between logical blocks as shown by FIG. 7B. FIG. 7B shows an exemplary track 716 of data being written on a cartridge. In this example, the write append limiter 710 between the logical blocks 711–712. A new block 714 being written is the third block past the write append limiter. Therefore, if the write allowance index is "two," then the write append limiter should be updated by moving it to the block 712 (i.e., two blocks behind the current block being written), so that the write allowance index is satisfied. Equation 1, described above, is similarly satisfied by this example.

Write Allowance Index-Another Example

Figure 6:
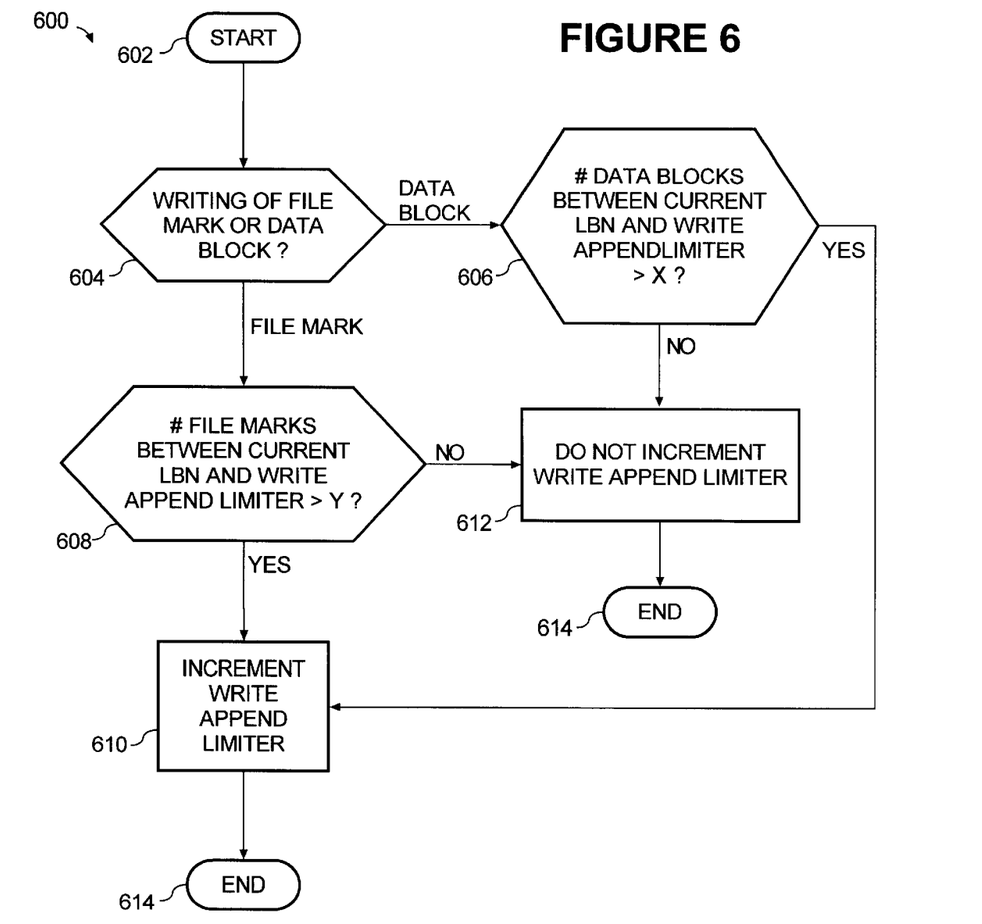
FIG. 6 is a flowchart showing an alternative sequence for advancing the write append limiter according to the invention.

FIG. 6 shows a sequence 600 to illustrate another technique for performing the operation of advancing the write append limiter (i.e., implementing step 418, FIG. 4). For ease of explanation, but without any intended limitation, the example of FIG. 6 is described in the context of the system 100 described above. In the example of FIG. 6, the write allowance index comprises a dual-component index, including a file mark portion (abbreviated as "y") and a data block portion (abbreviated as "x"), both integers. File marks are uniquely identifiable marks stored on tape to signal file boundaries or other convenient data constructs. As an example, the contents of a file mark may comprise a small data record with a unique header, and each file mark may have an LBN.

The steps 600 are initiated in step 602. In step 604, the drive engine 110 determines whether the write operation to be performed in step 420 (FIG. 4) will write a file mark or a data block. If step 420 will write a file mark, then step 604 advances to step 608. In step 608, the drive engine 110 determines whether the number of file marks between the target write location of step 420 and the write append limiter exceed the file mark component of the write allowance index (i.e., "y"). If so, the current write location is stretching out too far from the write append limiter, and the write append limiter must be adjusted in step 610. Namely, in step 610 the drive engine 110 advances the write append limiter forward by the number of file marks being written, that is, one in this example. The drive engine 110 also stores the new write append limiter at the cartridge's location 151 (FIG. 1). Alternatively, if the current write location is not impermissibly forward of the write append limiter, then the write append limiter is not incremented (step 612).

Referring back to step 604, if the drive engine 110 finds that the write operation to be performed in step 420 (FIG. 4) will write a data block, then step 604 advances to step 606. In step 606, the drive engine 110 asks whether the number of data blocks between the target write location of step 420 and the write append limiter exceeds the amount of the data block component (i.e., "x") of the write allowance index. If so, the drive engine 110 updates the write append limiter in step 610. Namely, step 610 advances the write append limiter by the number of logical blocks written, which is "one" in the present example. The drive engine 110 also stores the new write append limiter at the cartridge's location 151 (FIG. 1).

If there is a negative answer to step 606, the write append limiter is not incremented (step 612). After completion of step 612 or step 610, the routine 600 ends in step 614, thereby completing step 418 and thereafter advancing to step 420 (FIG. 4).

Figure 8:
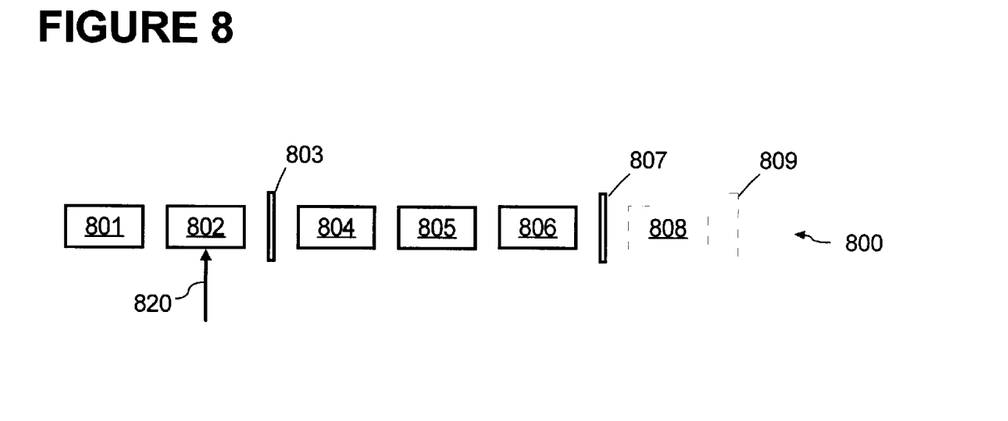
FIG. 8 is a block diagram illustrating the relationship between various logical blocks, file marks, a write append limiter, and a dual component write allowance index, according to the invention.

To further explain the routine 600, FIG. 8 shows an exemplary track 800 of data on a cartridge. The track includes data blocks 801–802, 804–806, 808 and file marks 803, 807. The write append limiter 820 points to the logical block 802, the write allowance index (not shown) specifies two file marks (y=2) and two data blocks (x=2), and the data block 808 is currently being written. In this example, step 604 recognizes that a data block is being written, and advances to step 606. There are three data blocks between the current data block 808 and the write append limiter 820 (i.e., blocks 804–806). Since the data block component of the write allowance index is two, which is less than three, step 606 must increment the write append limiter (step 610).

In another example, still referring to FIG. 8, the file mark 809 is being written. The write allowance index (not shown) specifies two file marks (y=2) and two data blocks (x=2). In this case, step 604 recognizes that a file mark is being written, and advances to step 608. Since the write allowance index's file mark component is two, and there are not more than two file marks between the write append limiter 802 and the current write location 809, the write append limiter is not updated (step 612).

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of operating a read/write drive to conduct read/write operations upon removable, serially accessible, data storage media so as to render the media write-once-read-many to a hierarchically superior host, the method comprising the following operations performed by the read/write drive:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs before the write append limiter, generating an error message;

if the target write location occurs at a location other than before the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write locations.

2. The method of claim 1, the write allowance index specifying an amount of data.

3. The method of claim 1, the operations of further comprising: responsive to the drive receiving an unload command, the drive writing a most recently updated write append limiter to the data storage medium.

4. The method of claim 1, where the operation of establishing a target write location on the data storage medium comprises: receiving specification of the target write location from the host.

5. The method of claim 1, where the operation of establishing a target write location on the data storage medium comprises: establishing the target write location at the write append limiter.

6. The method of claim 1, where: following the storage of write data, the drive stores a prescribed size of trailing metadata upon the data storage medium; and the write allowance index specifies an amount of data substantially equal to the trailing metadata.

7. The method of claim 1, the operations further including accepting host requests to decrease the write allowance index and rejecting host requests to increase the write allowance index.

8. The method of claim 1, where the operation of storing write data stores data logically divided into blocks, and the write allowance index comprises a number of logical blocks expressed as an integer.

9. A method of operating a read/write drive to conduct read/write operations upon removable, serially accessible, data storage media so as to render the media write-once-read-many to a hierarchically superior host, the method comprising the following operations performed by the read/write drive:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs after the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write location;

if the target write location occurs at a location other than after the write append limiter, generating an error message.

10. The method of claim 9, the write allowance index specifying an amount of data.

11. The method of claim 9, the operations of further comprising: responsive to the drive receiving an unload command, the drive writing a most recently updated write append limiter to the data storage medium.

12. The method of claim 9, where the operation of establishing a target write location on the data storage medium comprises: receiving specification of the target write location from the host.

13. The method of claim 9, where the operation of establishing a target write location on the data storage medium comprises: establishing the target write location at the write append limiter.

14. The method of claim 9, where: following the storage of write data, the drive stores a prescribed size of trailing metadata upon the data storage medium; and the write allowance index specifies an amount of data substantially equal to the trailing metadata.

15. The method of claim 9, the operations further including accepting host requests to decrease the write allowance index and rejecting host requests to increase the write allowance index.

16. The method of claim 9, where the operation of storing write data stores data logically divided into blocks, and the write allowance index comprises a number of logical blocks expressed as an integer.

17. A signal-bearing medium tangibly embodying a program of machine-readable instructions executable by a digital processing apparatus to perform a method for operating a read/write drive to conduct read/write operations upon removable, serially accessible, data storage media so as to render the media write-once-read-many to a hierarchically superior host, the method comprising the following operations performed by the read/write drive:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs before the write append limiter, generating an error message;

if the target write location occurs at a location other than before the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write locations.

18. The medium of claim 17, the write allowance index specifying an amount of data.

19. The medium of claim 17, the operation of further comprising: responsive to the drive receiving an unload command, the drive writing a most recently updated write append limiter to the data storage medium.

20. The medium of claim 17, where the operation of establishing a target write location on the data storage medium comprises: receiving specification of the target write location from the host.

21. The medium of claim 17, where the operation of establishing a target write location on the data storage medium comprises: establishing the target write location at the write append limiter.

22. The medium of claim 17, where: following the storage of write date, the drive stores a prescribed size of trailing metadata upon the date storage medium; and the write allowance index specifies an amount of data substantially equal to the trailing metadata.

23. The medium of claim 17, the operations further include accepting host requests decrease the write allowance index and rejecting host requests to increase the write allowance index.

24. The medium of claim 17, where the operation of storing write data stores data logically divided into blocks, and the write allowance index comprises a number of logical blocks expressed as an integer.

25. A signal-bearing medium tangibly embodying a program of machine-readable instructions executable by a digital processing apparatus to perform a method for operating a read/write drive to conduct read/write operations upon removable, serially accessible, data storage media so as to render the media write-once-read-many to a hierarchically superior host, the method comprising the following operations performed by the read/write drive:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs after the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write locations;

if the target write location occurs at a location other than after the write append limiter, generating an error message.

26. The medium of claim 25, the write allowance index specifying an amount of data.

27. The medium of claim 25, the operation of further comprising: responsive to the drive receiving an unload command, the drive writing a most recently updated write append limiter to the data storage medium.

28. The medium of claim 25, where the operation of establishing a target write location on the data storage medium comprises: receiving specification of the target write location from the host.

29. The medium of claim 25, where the operation of establishing a target write location on the data storage medium comprises: establishing the target write location at the write append limiter.

30. The medium of claim 25, where: following the storage of write date, the drive stores a prescribed size of trailing metadata upon the date storage medium; and the write allowance index specifies an amount of data substantially equal to the trailing metadata.

31. The medium of claim 25, the operations further include accepting host requests decrease the write allowance index and rejecting host requests to increase the write allowance index.

32. The medium of claim 25, where the operation of storing write data stores data logically divided into blocks, and the write allowance index comprises a number of logical blocks expressed as an integer.

33. A logic circuit of multiple interconnected electrically conductive elements configured to perform operations to operate a read/write drive to conduct read/write operations upon removable, serially accessible, data storage media so as to render the media write-once-read-many to a hierarchically superior host, the method comprising the following operations performed by the read/write drive:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs before the write append limiter, generating an error message;

if the target write location occurs at a location other than before the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write locations.

34. A logic circuit of multiple interconnected electrically conductive elements configured to perform operations to operate a read/write drive to conduct read/write operations upon removable, serially accessible, data storage media so as to render the media write-once-read-many to a hierarchically superior host, the method comprising the following operations performed by the read/write drive:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs after the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write locations;

if the target write location occurs at a location other than after the write append limiter, generating an error message.

35. A data storage library, comprising:

robotics;

multiple cartridge slots accessible by the robotics;

a read/write drive;

a controller, coupled to the robotics and the read/write drive;

where the read/write drive includes a drive mechanism and drive engine, and the drive engine is programmed to perform operations to conduct read/write operations upon removable, serially accessible, data storage media so as to render the media write-once-read-many to a hierarchically superior host, the operations comprising:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs before the write append limiter, generating an error message;

if the target write location occurs at a location other than before the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write locations.

36. The library of claim 35, the write allowance index specifying an amount of data.

37. The library of claim 35, further comprising: responsive to the drive receiving an unload command, the drive writing a most recently updated write append limiter to the data storage medium.

38. The library of claim 35, where the operation of establishing a target write location on the data storage medium comprises: receiving specification of the target write location from the host.

39. The library of claim 35, where the operation of establishing a target write location on the data storage medium comprises: establishing the target write location at the write append limiter.

40. The library of claim 35, where: following the storage of write data, the drive stores a prescribed size of trailing metadata upon the data storage medium; and the write allowance index specifies an amount of data substantially equal to the trailing metadata.

41. The library of claim 35, the operations further including accepting host requests to decrease the write allowance index and rejecting host requests to increase the write allowance index.

42. The library of claim 35, where the operation of storing write data stores data logically divided into blocks, and the write allowance index comprises a number of logical blocks expressed as an integer.

43. A data storage library, comprising:

robotics;

multiple cartridge slots accessible by the robotics;

a read/write drive; a controller, coupled to the robotics and the read/write drive;

where the read/write drive includes a drive mechanism and drive engine, and the drive engine is programmed to perform operations to conduct read/write operations upon removable, serially accessible, data storage media so as to render the media write-once-read-many to a hierarchically superior host, the operations comprising:

receiving one or more write requests from the host, each write request being accompanied by corresponding write data;

establishing a target write location on a data storage medium;

responsive to each write request, performing operations to store the write data so as to preserve any previously stored data, the operations comprising:

referencing a write append limiter sequentially identifying a location on the data storage medium before which data is not permitted to be altered;

if the target write location occurs after the write append limiter, storing the write data upon the data storage medium beginning at the target write location, and determining whether an end of the write data exceeds the write append limiter by more than a write allowance index, and only if so, advancing the write append limiter to position the write append limiter to one of:

at a write location, or between adjacent write locations;

if the target write location occurs at a location other than after the write append limiter, generating an error message.

44. The library of claim 43, the write allowance index specifying an amount of data.

45. The library of claim 43, further comprising: responsive to the drive receiving an unload command, the drive writing a most recently updated write append limiter to the data storage medium.

46. The library of claim 43, where the operation of establishing a target write location on the data storage medium comprises: receiving specification of the target write location from the host.

47. The library of claim 43, where the operation of establishing a target write location on the data storage medium comprises: establishing the target write location at the write append limiter.

48. The library of claim 43, where: following the storage of write data, the drive stores a prescribed size of trailing metadata upon the data storage medium; and the write allowance index specifies an amount of data substantially equal to the trailing metadata.

49. The library of claim 43, the operations further including accepting host requests to decrease the write allowance index and rejecting host requests to increase the write allowance index.

50. The library of claim 43, where the operation of storing write data stores data logically divided into blocks, and the write allowance index comprises a number of logical blocks expressed as an integer.

* * * * *